United States Patent
McClure et al.

(10) Patent No.: US 7,480,503 B2
(45) Date of Patent: Jan. 20, 2009

(54) SYSTEM AND METHODS FOR PROVIDING TELECOMMUNICATION SERVICES

(75) Inventors: Paul A. McClure, Princeton, MN (US); Steven M. Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 514 days.

(21) Appl. No.: 10/874,110

(22) Filed: Jun. 21, 2004

(65) Prior Publication Data

US 2005/0282536 A1    Dec. 22, 2005

(51) Int. Cl.
*H04Q 7/20* (2006.01)
(52) U.S. Cl. .................................. 455/422.1
(58) Field of Classification Search ............. 455/422.1, 455/426.2, 426.1, 554.1, 554.2, 560, 445, 455/446; 379/93.05, 93.09, 93.33, 90.01, 379/399.01, 399.02, 413.02, 413.03, 413.04, 379/398; 370/350, 352
See application file for complete search history.

(56) References Cited

U.S. PATENT DOCUMENTS

| | | | |
|---|---|---|---|
| 4,775,997 A | 10/1988 | West, Jr. et al. | |
| 4,989,230 A | 1/1991 | Gillig et al. | |
| 5,526,403 A | 6/1996 | Tam | |
| 5,771,465 A | 6/1998 | Böjeryd | |
| 6,205,329 B1 * | 3/2001 | Zilberfarb et al. | 455/426.2 |
| 6,498,938 B1 * | 12/2002 | Morrow, Sr. | 455/557 |
| 6,788,662 B2 * | 9/2004 | Ozluturk et al. | 370/335 |
| 2002/0110118 A1 * | 8/2002 | Foley | 370/352 |
| 2003/0018975 A1 * | 1/2003 | Stone | 725/105 |
| 2005/0273489 A1 * | 12/2005 | Pecht et al. | 709/203 |
| 2006/0046750 A1 * | 3/2006 | Deschenes | 455/462 |

OTHER PUBLICATIONS

NextNet Wireless, NextNet Expedience, NLOS Plug-and-Play Portable Customer Premise Equipment Integrated Radio Modem, Non Line-of-Sight Broadband Wireless Residential Subscriber Unit (RSU-2510A), http://www.nextnetwireless.com/assets/news/media/PDF/rsu_2510AMOD_rev1.pdf, 2 pages (Sep. 21, 2004).

* cited by examiner

*Primary Examiner*—Melody Mehrpour
(74) *Attorney, Agent, or Firm*—Townsend and Townsend and Crew LLP

(57) ABSTRACT

Systems and methods are disclosed for providing telecommunication services. In one embodiment, the system comprises an antenna at a customer premises, to transmit outbound voice communications in a wireless protocol and to receive inbound voice communications in the wireless protocol. A demarcation device is coupled with the antenna converts inbound voice communications from the wireless protocol to a wired format and converts outbound voice communications from the wired format to the wireless protocol. An interface to the customer premises is coupled with the demarcation device. The interface transmits inbound voice communications in the wired format to the customer premises via a first internal transport medium and transmits outbound voice communications received in the wired format on the first internal transport medium to the demarcation device.

25 Claims, 8 Drawing Sheets

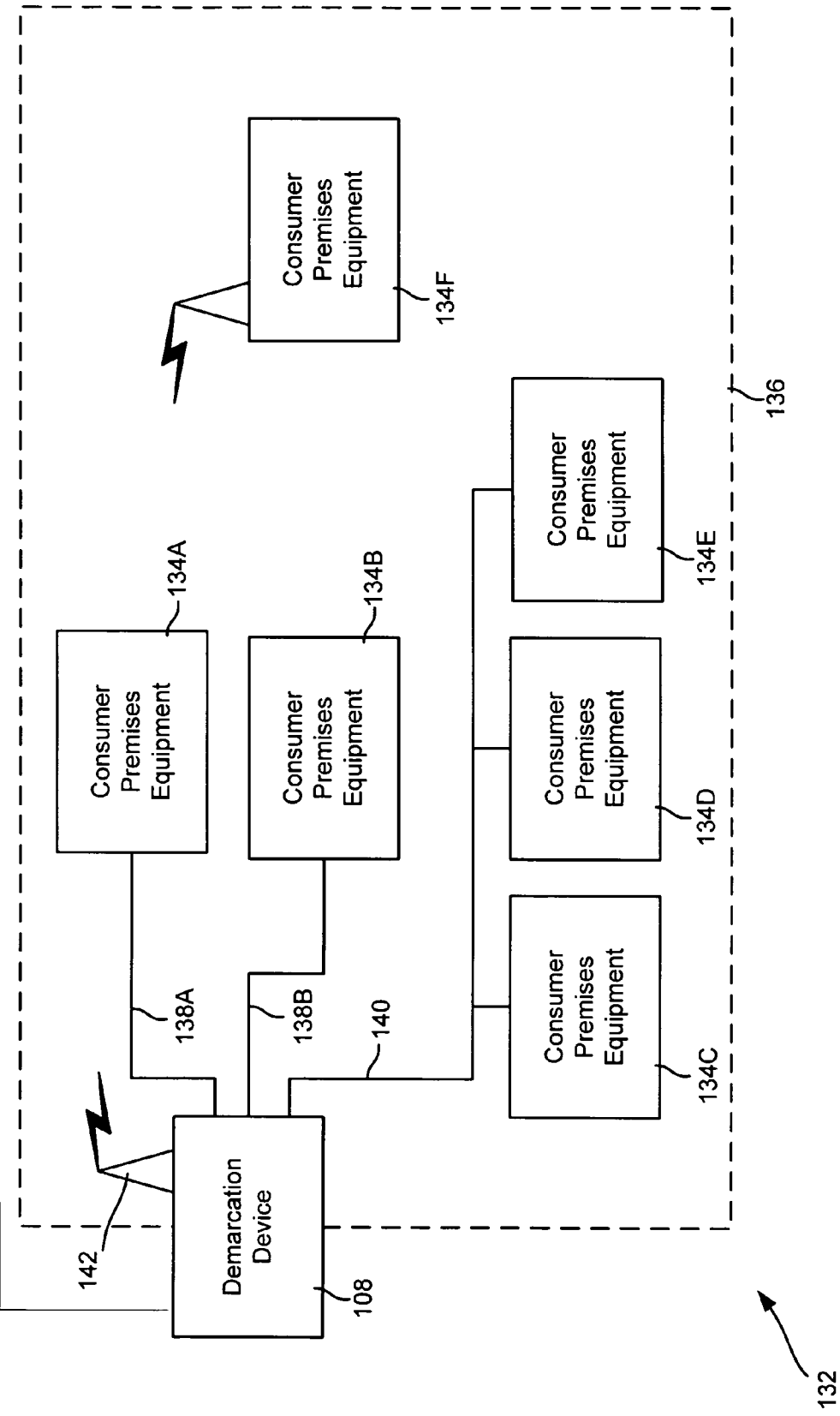

SYSTEM AND METHODS FOR PROVIDING TELECOMMUNICATION SERVICES

BACKGROUND OF THE INVENTION

The present invention relates to the provision of telecommunication services. In order to provide telecommunication services to a customer, wiring, such as copper cabling, must be wired from the central office to the customer's premises. This wiring may be used to provide a variety of services to the customer, including telephone service, video distribution (cable, vDSL, and the like), and data distribution (connectivity to xDSL modem or cable modem, Ethernet cable within the customer's premises, and the like). Installation costs to install wiring or upgrade wiring can be expensive. In some cases, the customer may not be able to obtain services because of non-existent or old cabling. In addition, the telecommunications service provider can incur high maintenance costs to maintain existing wire.

BRIEF SUMMARY OF THE INVENTION

Systems and methods are disclosed for providing telecommunication services. In one embodiment, the system comprises an antenna at the customer premises. The antenna transmits outbound voice communications in a wireless protocol and receives inbound voice communications in the wireless protocol. A demarcation device, such as a network interface device, is coupled with the antenna. The demarcation device converts the inbound voice communications from the wireless protocol to a wired format, such as a Plain Old Telephone Service (POTS) format and converts the outbound voice communications from the wired format to the wireless protocol. An interface to the customer premises is coupled with the demarcation device. The interface transmits the inbound voice communications in the wired format to the customer premises via a first internal transport medium and transmits the outbound voice communications received in the wired format on the first internal transport medium to the demarcation device. Optionally, the system may also comprise an automatic gain control, coupled with the antenna and the demarcation device, to automatically adjust the gain of the inbound voice communications received from the antenna.

In some embodiments, the antenna may also receive other types of telecommunications in the wireless protocol. In these embodiments, the demarcation device is further configured to convert inbound data and/or video communications from the wireless protocol to a digital data format or digital video format. The demarcation device also converts outbound data communications from the digital data format to the wireless protocol. Thus, the system may also include either or both a data interface or a video interface to the customer premises. The data interface and/or video interface transmit converted inbound data communications from the demarcation device via an internal transport medium and the data interface transmit outbound data communications received from internal transport medium(s) to the demarcation device. By way of example, the data interface may be a digital subscriber line (DSL) interface to the customer premises, the digital data format may be a DSL format, and an internal transport medium used to transport the data may be telephone wiring. Alternate embodiments of digital and video data interfaces, formats, and internal transport mediums are also disclosed.

The system may also further comprise a distribution point, to receive the outbound voice communications from the antenna and to transmit the inbound voice communications to the antenna. In one embodiment, the distribution point may be a cellular base station. The wireless protocol may be any wireless protocol, such as Code Division Multiple Access (CDMA) or Global System for Mobile communications (GSM).

In a second embodiment, a system for providing telecommunication services comprises an antenna at the customer premises, to transmit outbound telecommunications in a wireless protocol and to receive inbound telecommunications in the wireless protocol. An automatic gain control is coupled with the antenna to automatically adjust the gain of the inbound telecommunications. A demarcation device is coupled with the automatic gain control. The demarcation device determines the inbound telecommunications is one of voice communications, data communications, and video communications and converts the inbound telecommunications from the wireless protocol to one of a Plain Old Telephone Service (POTS) format, a digital data format, and a digital video format. Additionally, the demarcation device converts outbound voice communications from the POTS format to the wireless protocol and converts outbound data communications from the digital data format to the wireless protocol. The system further comprises a POTS interface, a data interface, and a video interface, all of which are coupled with the demarcation device. The interfaces transmit inbound communications which have been converted to the appropriate format to one of a first, second, or third internal transport medium and transmit outbound communications from the associated transport medium to the demarcation device for conversion. In some embodiments, one or more of the internal transport mediums may be the same internal transport medium.

In a third embodiment, a network interface device (NID) for providing telephone services to a customer premises is disclosed. The NID comprises a receiver to receive inbound voice communications from an antenna in the wireless protocol and a transmitter to transmit outbound voice communications in the wireless protocol. Additionally, the NID further includes a processor, coupled with the receiver and the transmitter, to convert the inbound voice communications from the wireless protocol to a digital wired format and to convert the outbound voice communications from the digital wired format to the wireless protocol. A converter is coupled with the processor, and may convert the inbound voice communications from the digital wired format to POTS and converts the outbound voice communications from POTS to the digital wired format. An interface is coupled with the converter. The interface transmits the inbound voice communications in the POTS format to the customer premises via a first internal transport medium and to transmit the outbound voice communications received in the POTS format on the first internal transport medium to the converter. In some embodiments, the NID may also receive and transmit other types of telecommunications, such as data communications and video communications. Accordingly, the processor may be used to convert to and from the wireless protocol and digital data format and convert from the wireless protocol to a digital video format, and the NID may further comprise appropriate interface(s) to internal transport mediums.

In another embodiment, a method of providing telecommunication services to a customer premises is disclosed. The method comprises providing an antenna configured to transmit outbound communications in a wireless protocol and to receive inbound communications in the wireless protocol using a wireless transport medium and providing a demarcation device configured to convert inbound communications from the wireless protocol to a Plain Old Telephone Service (POTS) format and to convert the outbound communications from the POTS format to the wireless protocol. The method further comprises receiving inbound communications at the antenna, converting the inbound communications from the wireless protocol to the POTS format using the demarcation device, and transmitting the inbound communications in the POTs format to the customer premises via a first internal transport medium. The method may also further comprise receiving outbound communications in the POTS format from the customer premises via the first internal transport medium, converting the outbound communications from the POTS format to the wireless protocol using the demarcation device, and transmitting the outbound communications in the wireless protocol using the antenna.

In some embodiments, providing the demarcation device may comprise providing a demarcation device further configured to convert inbound communications from the wireless protocol to one of a digital data format and a digital video format and to convert outbound communications from the digital data format to the wireless protocol. Thus, the method may further comprise receiving second inbound communications at the antenna and determining, with the demarcation device, the second inbound communications are one of data communications or video communications. The second inbound communications are converted from the wireless protocol to the appropriate digital data format or video data format using the demarcation device. Then, the second inbound communications are transmitted in the converted format to the customer premises via a second internal transport medium. Additionally, or alternately, the method may also comprise providing an automatic gain control circuit to automatically adjust the gain of inbound communications received via the antenna.

BRIEF DESCRIPTION OF THE DRAWINGS

Illustrative embodiments in accordance with the invention are illustrated in the drawings in which:

FIGS. 1A-1D illustrate systems for using demarcation devices according to certain embodiments of the invention;

DETAILED DESCRIPTION OF THE INVENTION

Figure 1A:
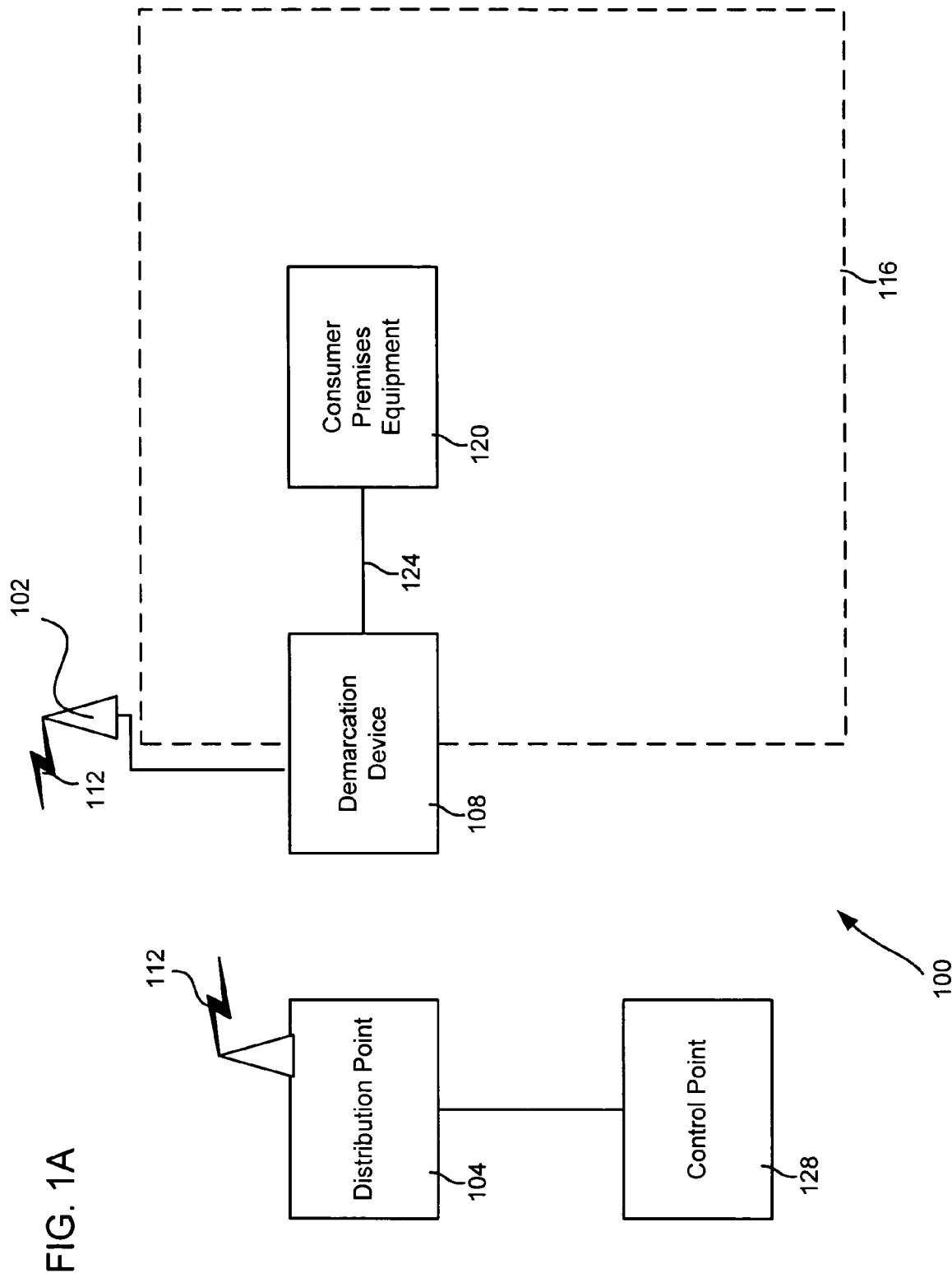

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Certain embodiments of the present invention are directed to demarcation devices that can be used to provide telecommunication services, as well as to methods and systems of using such devices. A demarcation device can be any device capable of serving as an interface between a customer premises and a telecommunication service provider's network. One particular demarcation device is a network interface device ("NID"), described in detail below. In certain aspects, demarcation devices can be used to separate received telecommunication information into discrete sets, and to process certain of those sets independently from other sets and/or transmit different sets to different locations, perhaps through the use of different interfaces. Further details of demarcation devices are disclosed in U.S. patent application Ser. No. 10/377,280 entitled "ADSL/DBS NETWORK INTERFACE DEVICE AND METHODS AND SYSTEMS FOR USING THE SAME", filed Feb. 27, 2003, the details of which are hereby incorporated by reference.

As used herein, references to the term "telecommunication information" should be interpreted to include any information that can be transmitted or carried by a telecommunication service provider's network or by any other telecommunication network, including but not limited to the Internet. Such information includes, for example, voice signals (e.g., wired format, such as Plain Old Telephone Service or "POTS"), audio and video signals (encoded in any standard and/or proprietary, digital and/or analog format now known or hereafter developed, using any of a variety of means known to those skilled in the art, such as HDTV, NTSC and PAL formatting, as well as, for example, any of the MPEG digital encoding and/or compression algorithms), and data. Such data can be formatted according any of a variety of protocols familiar in the art, including in particular any of the protocols known in the art as part of the TCP/IP suite, in particular the Internet Protocol ("IP"). Data can also include infrastructural protocols, including, for instance, routing protocols and protocols necessary to implement advanced networking schemes known to those skilled in the art, such as multiprotocol label switching ("MPLS"), Ethernet in the first mile ("EFM"), to name but two In this document, the term "telecommunication service provider" can mean any entity that provides telecommunication service to a customer's premises, including, merely by way of example, local exchange carriers, and cable television carriers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a exchange carrier to provide broadcast television signals to a customer premises using the exchange carrier's wireless transport medium operated by the exchange carrier.

The term "telecommunication information set" is used to describe a discrete subset of the telecommunication information transmitted across a particular transport medium and/or received by a demarcation device. Generally, the telecommunication information that is classified part of a particular information set shares a common characteristic. Merely by way of example, an information set can comprise telecommunication information of a particular type, (e.g., voice, IP data, encoded video, and such). Merely by way of example, a demarcation device might transmit simultaneously a first information set comprising voice signals, a second information set comprising data (e.g., Internet data), and a third information set comprising video signals.

In certain embodiments, demarcation devices can support the one-way flow of telecommunication information, as for example, in the case of a simple set top box, which can receive data representing a video signal in a wireless protocol, decode that data, and transmit a video signal to an attached television.

In other embodiments, however, demarcation devices can support bidirectional flow of telecommunication information. In still other embodiments, a demarcation device can be configured to support both unidirectional and bidirectional information flows simultaneously, depending on the type of telecommunication information transmitted or the source of the information.

In one important aspect, demarcation devices can function to isolate the telecommunication service provider's network from the network at the customer premises. As described in detail below, the service provider's network can be a cellular or PCS network using any known a wireless protocol, such as Code Division Multiple Access (CDMA), Global System for Mobile communications (GSM), Local Multipoint Distribution Service (LMDS), Multipoint Microwave Distribution System (MMDS), WiFi, WiMax, or other wireless protocol. The customer's network can be termed an "internal transport medium." The internal transport media can be any cable, wire or other medium capable of carrying telecommunication information, including, but not limited to, twisted pair copper wiring (shielded or unshielded, including, for example, unshielded cables complying with industry-standard categories 3, 5, 5e, 6 and 7 and shielded cables commonly known as Token Ring™ cables, to name a few), optical fiber (including both single-mode and multimode fiber, as well as doped fiber, wavelength-division multiplexed, coarse wavelength-division multiplexed, wide wavelength-division multiplexed, dense wavelength-division and ultra-dense wavelength-division multiplexed fiber) and coaxial cable. Other examples of internal transport media can also include universal serial bus ("USB") cable, cable complying with the Institute of Electrical and Electronics Engineers' ("IEEE") 1394 standard, as well as any medium capable of complying with the many local area networking standards known in the art. Of course, an internal transport medium need not be a physical medium; it can also comprise any of a wide variety of wireless transmissions, including (but not limited to) infra-red transmissions, radio frequency ("RF") transmissions, and transmissions complying with standards developed by any of the IEEE's working groups governing wireless communication (e.g., the 802.11, 802.15, 802.16 and 802.20 working groups).

FIG. 1A illustrates a first exemplary systems for providing telecommunication services using a demarcation device. The system 100 includes a distribution point 104 in communication with an antenna 102 via a wireless transport medium 112, such as a cellular, a PCS, or other type of radio frequency (RF) medium. In one sense, distribution point 104 can be considered the source of telecommunication information transmitted to customer premises and the recipient of telecommunication information transmitted from customer premises 116, although, as described below, distribution point 104 often will be neither the ultimate source nor the ultimate recipient of telecommunication information. By way of example, distribution point 104 may be a cellular base station. Distribution point 104 uses a wireless protocol (e.g., CDMA, GSM, LMDS, MMDS, WiFi, WiMax) to transmit and receive telecommunications.

In general, distribution points can be classified, inter alia, as discrete distribution points or complex distribution points. With respect to a particular information set, a discrete distribution point often transmits only the necessary or desired information to the demarcation device 108. In contrast, a complex distribution point can transmit the entire information set to the demarcation device 108. The contrast may be illustrated with regard to video distribution: A discrete distribution point may perform channel switching (at the request of the demarcation device), encoding and sending only the desired channel information to the demarcation device. In contrast, a complex distribution point might rely upon the demarcation device to perform all channel switching. Those skilled in the art will appreciate that each scheme presents relative advantages and disadvantages.

The antenna 102 is coupled with demarcation device 108. Distribution point 104 can be capable of transmitting and/or receiving any type of telecommunication information to/from demarcation device 108 via antenna 102 using wireless transport medium 112. For ease of description, FIG. 1A does not show any additional sources or recipients of telecommunication information in communication with distribution point 104, but, those skilled in the art will recognize that, in many embodiments, distribution point 104 communicate with multiple customer premises (perhaps via an antenna and demarcation device at each customer premises) and often is neither the ultimate source nor the ultimate recipient of telecommunication information. Instead, distribution point 104 often can serve as the intermediary between one or more customer premises (e.g., 116) and one or more larger telecommunication networks and/or telecommunication information providers, which, as discussed above, can include cable television networks, telephone networks, data networks, and the like. Further, many such networks can be coupled with the Internet, so that distribution point 104 can serve as a gateway between customer premises and any source and/or recipient of telecommunication information that has a connection to the Internet. The interconnection of telecommunication networks is well known in the art and need not be discussed here, other than to note that distribution point 104 can be configured to transmit telecommunication information to (and receive telecommunication information from) virtually any source or recipient of telecommunication information, through either direct or indirect (e.g., through the Internet) communication. Merely by way of example, a distribution point 104 can transmit video signals received from a television programming provider to customer premises equipment over wireless transport medium 112 using a wireless protocol. In other embodiments, distribution point 104 can be in communication with one or more other customer locations, allowing for private virtual circuits between customer premises 116 and those locations.

In system 100, demarcation device 108 can serve as the interface between the wireless transport medium 112 and customer premises 116. As conceptually illustrated in FIG. 1A, demarcation device 108 can be attached to an external wall of customer premises 116, which provides many advantages. For instance, if the telecommunication service provider desires to upgrade or otherwise change the demarcation device 108, a technician can perform any necessary changes at demarcation device 108 without entering the customer premises 116. Of course, demarcation device 108 also may be located at a variety of other locations, for example, within customer premises 116. As discussed in detail below, a demarcation device 108 may also be divided, with different portions situated at different locations, according to the requirements of the implementation.

Demarcation device 108 may be configured to convert to and from a wireless protocol to a protocol used on internal transport medium 124. Thus, demarcation device 108 may communicate with CPE 120 (which can be located inside customer premises 116) through internal transport medium 124, which can comprise any of the media discussed above. In particular, internal transport medium 124 can comprise the existing telephone wiring in customer premises 116 and, in some embodiments, is capable of carrying voice, data and video information, as well, perhaps, as other types of telecommunication information, using any of a variety of multiplexing schemes. For instance, as described in Edward H. Frank and Jack Holloway, "Connecting the Home with a Phone Line Network Chip Set," *IEEE Micro* (IEEE, March-April 2000), which is incorporated herein by reference, the Home Phoneline Networking Alliance ("HPNA") standards allow for simultaneous transmission of both voice information and Ethernet frames across twisted-pair copper telephone wiring. The term "consolidated distribution protocol" refers to any transmission protocol or convention that can be used to transmit multiple disparate information types on a shared medium. HPNA can be considered one type of consolidated transmission protocol, as can the related HPNA+ protocol, as well as the HomePlug™ standard, discussed in detail below. Any time multiple discrete information sets are transmitted on a shared/common transport medium (or a shared/common set of transport media), those information sets can be termed, collectively, "combined information sets." Often, a combined information set will be formatted with a consolidated distribution protocol, although those skilled in the art will recognize that such formatting is not always necessary; different information sets sometimes can share a common medium without needing to be translated with a consolidated transmission protocol.

Thus, telecommunication information received by distribution point 104 from any source (for instance, those discussed above) can be transmitted from distribution point 104 through wireless transport medium 112 to demarcation device 108 via antenna 112. Demarcation device 108 can then transmit the information through internal transport medium 124 to CPE 120. Likewise, telecommunication information can be transmitted via the reverse path to distribution point 104, where it can, for instance, be transmitted to an information recipient, such as a service provider (for instance, to request a pay-per-view movie or the like) or across the Internet to a recipient (such as in the case of an email message).

In certain embodiments, demarcation device 108 can receive configuration information, in some cases from a control point (e.g., 128), which, in the illustrated embodiment, is associated with distribution point 104. Distribution point 104 may receive configuration information from control point 128 and transmit the configuration information to demarcation device 108 via antenna 102 using wireless transmission media 112. In certain instances, control point 128 can be software and/or hardware operated by a telecommunication service provider for controlling certain features of the operation of demarcation device 108. For instance, control point 128 can instruct demarcation device 108 to provide (or cease to provide) a particular telecommunication service (e.g., video distribution) to customer premises 116, or to control how many information sets and/or transport media demarcation device 108 should accept at any given time. Control point 128 can also provide other direction to demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand. Control point 128 can further be used to test the availability, functioning and/or performance of demarcation device 108.

Configuration information can be any set of data or other information that can be interpreted by demarcation device 108 as operational instructions, including, but not limited to, commands to process certain information sets in certain ways (e.g., provide protocol conversion, allow transmission of the information set, deny transmission of the information set, direct transmission on a particular interface, and the like), commands to provide (or cease providing) a particular service (e.g., to provide access to a pay per view movie or an additional telephone line). Thus, in certain aspects, a telecommunication service provider can control the services provided to a customer in several ways. First, the provider can transmit a telecommunication information set to a demarcation device 108 only if the user of that device is authorized to receive the service associated with that information set. Alternatively, the service provider could send one or more services to a customer's demarcation device regardless of the customer's authorization to use the services, and rely on the device itself to prevent unauthorized access to those services.

Those skilled in the art will appreciate that certain control methods are more well-suited to certain services than to others. For instance, with respect to cable television services, the same set of information may be broadcast to many households, and the demarcation device is well-suited to control access to those services, allowing for greater efficiency in the providing of such services. In contrast, video on demand services may be controlled at a distribution point (or elsewhere), such that a demarcation device will only receive video on demand information if the customer already has requested (and been authorized to receive) that service, and the demarcation device thus may not need to provide access control functions with respect to that service.

According to some embodiments, demarcation device 108 can implement either of these access control schemes, or both in combination, as well as others. Moreover, demarcation device 108 can, in some cases, be configured to support a plurality of schemes transparently, so the customer can, for instance, request a service from demarcation device 108 (perhaps using one of the methods discussed above), and demarcation device can relay that request to the appropriate telecommunication service provider (and/or telecommunication information provider) if necessary, as well as reconfigure itself to allow access to that service, if necessary. Of course, demarcation device 108 also can be configured to take any necessary validating or authenticating action (such as notifying distribution point 104 and/or control point 128 that the service has been requested, and, optionally, receiving a return confirmation that the service has been authorized).

Based on the disclosure herein, those skilled in the art will recognize that a wide variety of configuration information can be transmitted to demarcation device 108, including those examples discussed above. Moreover, some types of configuration information may be sent periodically to demarcation device 108 to ensure that the configuration of demarcation device is current. Those skilled in the art will also recognize that configuration information can, in a sense, be considered a subset of the broader category of telecommunication information.

Figure 1B:
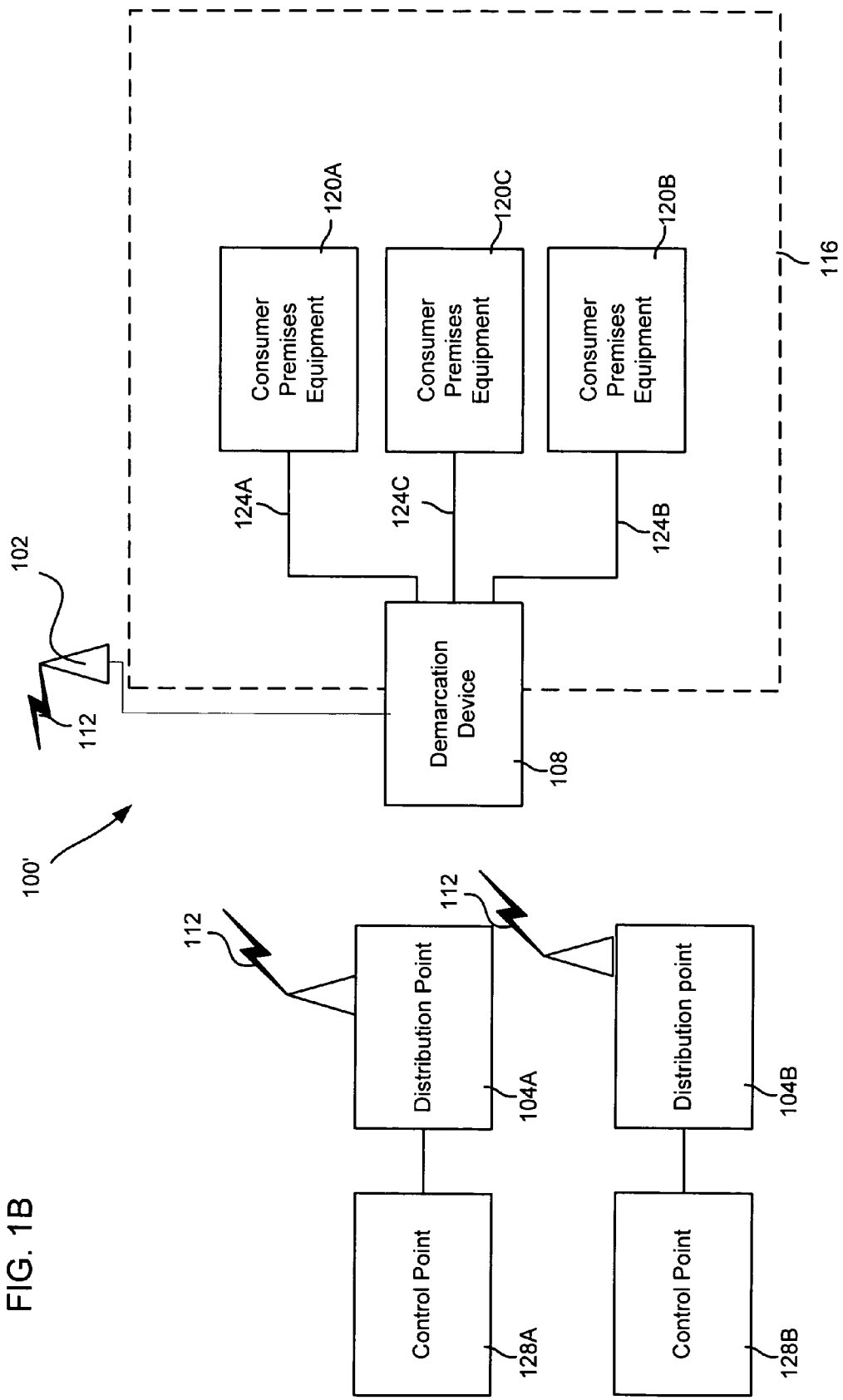

In an alternative embodiment, such as, for example system 100' illustrated in FIG. 1B, a single demarcation device 108 can provide connectivity to a plurality of distribution points (e.g., 104A, 104B), as well to a plurality of CPEs 120A, 120B, 120C. In such an embodiment, demarcation device 108 could include attachments for multiple internal transport media 124A, 124B, 124C. Moreover, each distribution point 104A, 104B may be associated with a different control point 128A, 128B, respectively. In alternative embodiments, a single control point could provide configuration information to demarcation device 108 with respect to both distribution points 104A, 104B.

As exemplified by system 132 in FIG. 1C, embodiments of the invention enable a single demarcation device 108 to serve multiple CPE 134A-F, each of which can be a different appliance, at a single customer premises 136. For instance, CPE 134A can be a computer with an Ethernet interface, CPE 134B can be a telephone, CPE 134C can be a video game system, CPE 134D can be a set-top box attached to a television, CPE 134E can be a computer with an HPNA interface, and CPE 134F can be a laptop computer equipped with a wireless network card.

Also as illustrated by system 132, demarcation device 108 can support multiple network topologies. For instance, demarcation device 132 can serve as a hub for a point-to-point network topology, with multiple point-to-point connections to CPE 134A, 134B via internal transport media 138A, 138B, respectively. In addition, demarcation device 132 can support a bus topology, as illustrated by internal transport medium 140, which can connect demarcation device 132 to CPE 134C, 134D, 134E. Demarcation device 108 can also be equipped with a wireless transmitter 142 for communication with wireless-capable CPE 134F. In this way, demarcation device 108 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. Demarcation device 108 can support these and other network topologies, serving as the hub in a 10Base-T network if necessary.

Figure 1D:
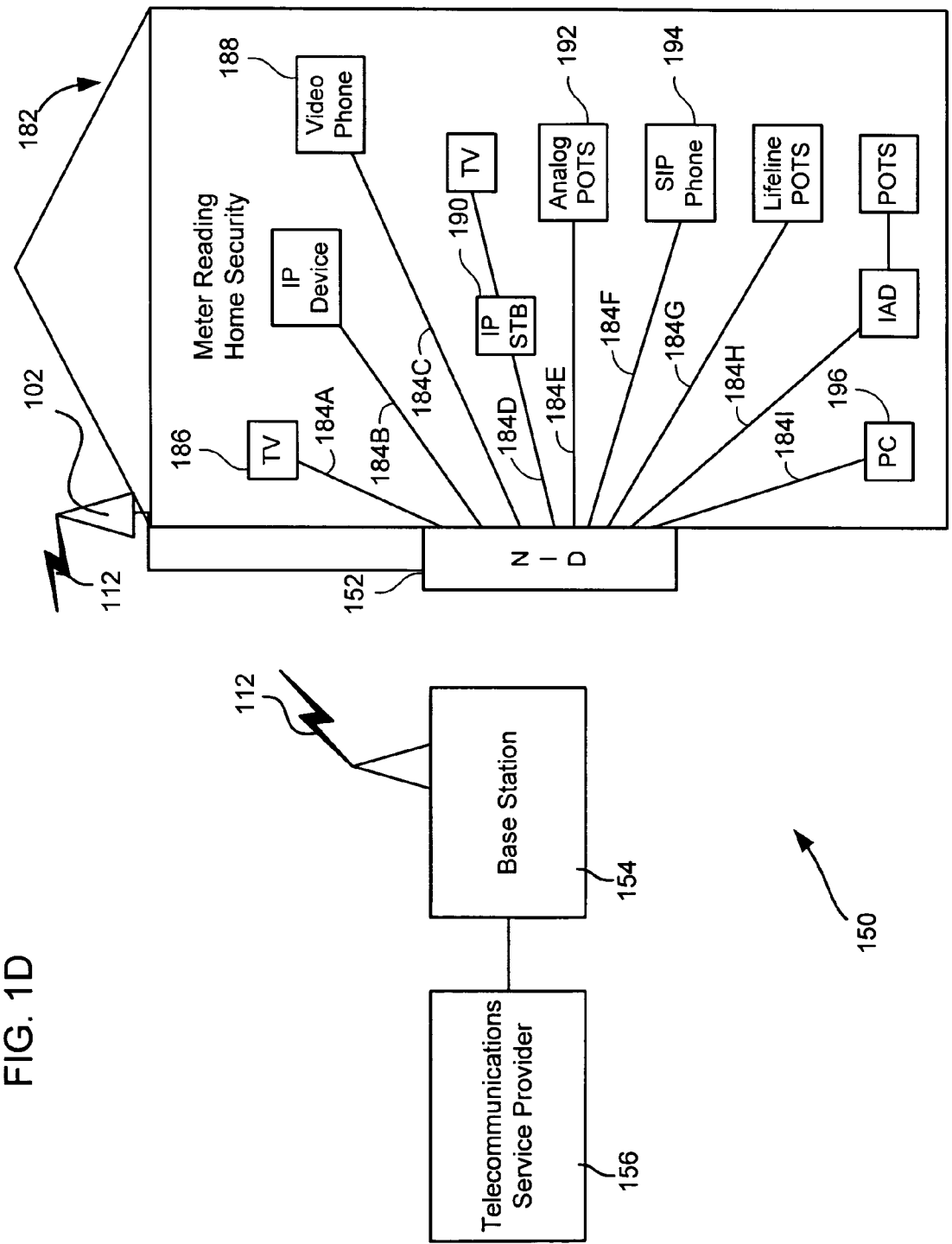

FIG. 1D illustrates another exemplary system 150 for using a demarcation device, such as NID 152. As previously described, the NID may receive telecommunications from a base station 154 over a wireless transport medium 112 using a wireless protocol. The base station 154 may be coupled with telecommunications service provider 156, which may, in some cases, be the source or destination of the telecommunications. Additionally, in some embodiments, the telecommunications service provider 156 may also provide configuration information to NID 152, which is transmitted to the NID over wireless transport medium 112 via base station 154.

NID 152 may be fixedly attached to an exterior wall at customer premises 182. NID 152 may then be coupled via one or more internal transport media 184A-I to a variety of CPE, including without limitation a television set 186, a video phone 188, an IP-compatible set-top box 190, an analog (POTS) telephone 192, an IP-compatible phone 194, and a personal computer 196. In this way, a NID 152 can be used to provide a plurality of telecommunication services to a customer premises 182. Generally, a NID 152 can incorporate all of the functionality of the demarcation devices discussed above. In alternate embodiments, other types of demarcation devices may be used to convert wireless signals received on antenna 142 to one or more communication protocols supported by one or more of the transport mediums 184A-184I. For instance, in an alternate embodiment, the demarcation device may be a set top box which may be used to convert video data to and from the wireless protocol used by wireless transmission medium 112.

It should be appreciated that in alternate embodiments, the system may be configured differently than described with reference to FIGS. 1A-1D. For example, in some embodiments, multiple demarcation devices may be provided at customer premises 116. Each demarcation device may be in communication with one or more CPEs through an internal transport medium. The multiple demarcation device may communicate with a single antenna 102 with a transmitter and receiver coupled between the demarcation devices and the antenna 102. Alternately, each demarcation device may communicate with its own antenna. This type of system may be used in a variety of implementations. For instance, if customer premises 116 is a multiple-dwelling unit ("MDU") or a commercial building, separate demarcation devices can be provided for each separate resident, family and/or tenant (or, alternatively, a single demarcation device, perhaps with more interfaces, can service multiple dwelling or business units). Thus, an individual antenna may be provided to transmit and receive signals on the radio frequency assigned to the demarcation device. Alternately, a single antenna may be used to transmit and receive on multiple frequencies.

In other embodiments, a single customer premises might have connections to a plurality of telecommunication service providers. For example, the system may include multiple distribution points coupled with a demarcation device via wireless transport medium. Merely by way of example, one distribution point could be associated with a cable television provider, while a second distribution point could be associated with a telephone company. Thus, the demarcation device could be used to convert voice communication signals received on wireless transport medium from the first distribution point to an analog POTS format to be transported via telephone wire (i.e., category 3 unshielded twisted pair copper) wire to a telephone and to convert video communication signals received on wireless transport medium from the second distribution point to a digital video format to be transported via coaxial cabling to a television. Of course, it should be noted that both telephone and video signals, as well as other forms of telecommunication information, can be provided through a single distribution point as well.

In another exemplary system, a demarcation device 108 can be in communication with a single distribution point 104, which is in communication with one or more telecommunication information providers. Each telecommunication information provider may be the source or recipient of one or more telecommunication information sets (each of which can be associated with a particular telecommunication service), each of which can be transmitted to (or received from) the distribution point. Distribution point 104 can also transmit these information sets to (or received them from) demarcation device 108, via wireless transport medium 112. As discussed below, the demarcation device can be capable of processing a plurality of such information sets in a variety of ways.

Figure 2:
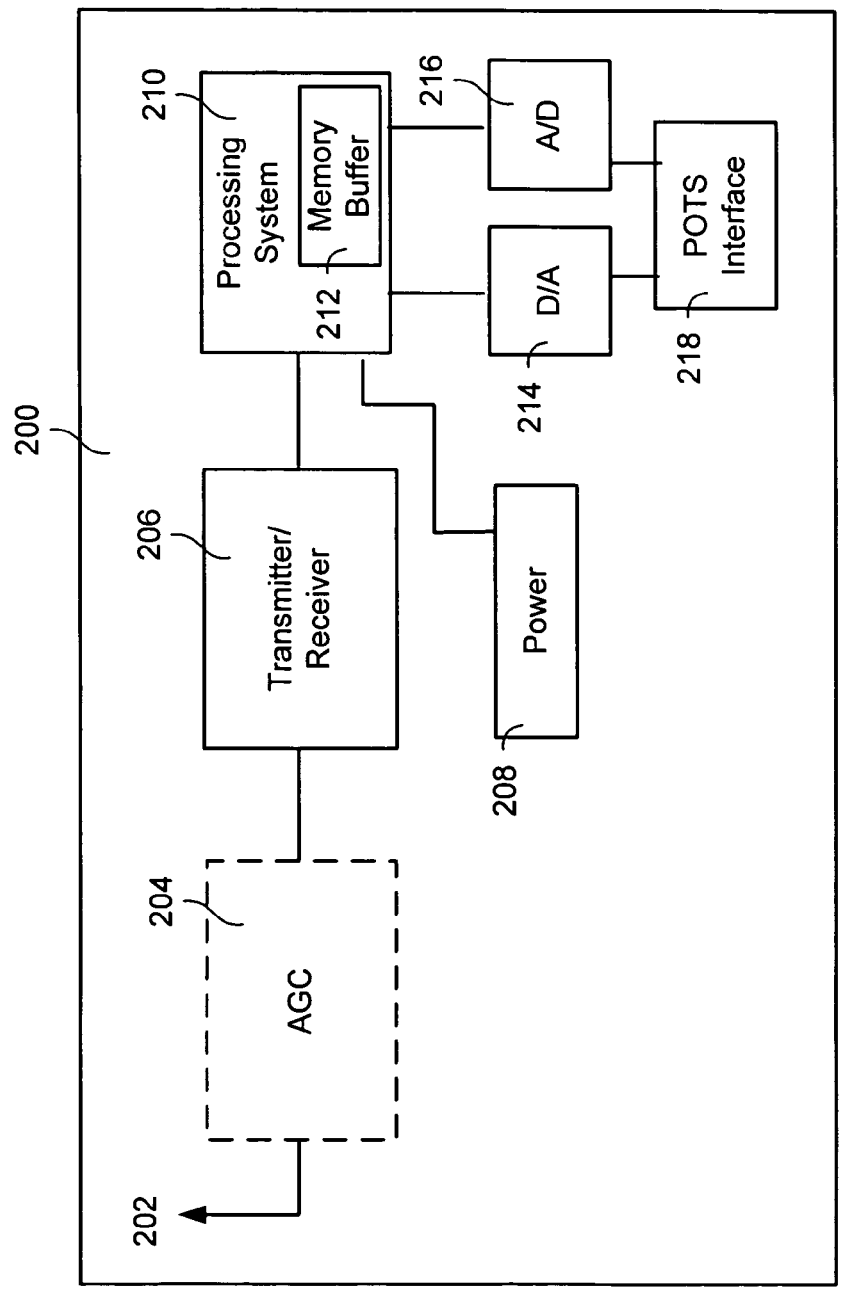
FIG. 2 illustrates an exemplary network interface device.

Turning now to FIG. 2, one exemplary embodiment of a demarcation device 200, such as a NID, is illustrated. The demarcation device 200 may include a coupling to antenna 202 for communicating with the wireless transport medium. Optionally, in some embodiments, the NID 200 may include an Automatic Gain Control (AGC) 204 for adjusting the gain of inbound communications received from antenna 202. The AGC 204 may be adjustable to set the means. This may allow the antenna to be adjusted for optimal signal strength when it is installed. The gain may then be automatically adjusted using a feedback control as the signal strength varies due to atmospheric changes or other environmental factors. In some embodiments, the distribution point(s) transmitting data to the demarcation device 200 may also include a gain controller for controlling the strength of signals sent to demarcation device 200.

The AGC 204 is coupled with transmitter/receiver 206. Transmitter/receiver 206 may be used to transmit/receive telecommunications in a wireless protocol format via antenna 202. By way of example, transmitter/receiver 206 may transmit and receive signals using CDMA, GSM, WiFi, WiMax, LMDS, MMDS, or other protocol. The transmitter/receiver 206 may be adapted to transmit and receive using one or more assigned digital codes (e.g., when using CDMA) or frequency/time slot combinations (e.g., with GSM). In some embodiments, an assigned code or frequency/time slot may be the same as what is assigned to the customer's cell phone. This may allow the customer to use one phone number for both residential/business and cellular phone use.

The transmitter/receiver 206 may be coupled with a processing system 210. Processing system 210 may comprise one or microprocessors, including digital signal processor ("DSP") chips, and/or memory devices, including both volatile (e.g., memory buffer 312, which may be used during conversion of telecommunications to and from the wireless protocol) and nonvolatile memories, as well as a variety of read-only memory devices known in the art, such as programmable read only memory ("PROM") devices and erasable programmable read only memory ("EPROM") devices (a term which should be interpreted to include electrically erasable programmable ("EEPROM") devices, in addition to other EPROM devices) and storage devices (including hard disk drives, optical drives and other media). In fact, in some embodiments, processing system 210 may comprise the equivalent of one or more personal computers, running any of a variety of operating systems, including variants of Microsoft's Windows™ operating system, as well as various flavors of the UNIX™ operating system, including open source implementations such as the several Linux™ and OpenBSD™ operating systems.

Processing system 210 may be used to convert inbound voice communications received via antenna 202 from the wireless protocol to a digital wired format. This may include converting, ignoring, or adding call configuration information that is applicable to either the POTS or wireless protocol, but not the other. Digital to Analog converter 214 may then be used to convert the digital signals to analog signals.

The voice communications are then transmitted to a POTS interface 218. The POTS interface 218 may be coupled with an internal transport medium located inside the customer premises. By way of example, the internal transport medium may be existing twisted pair cable (e.g., telephone wiring) located within the customer premises, which is coupled with one or more telephones. The POTS interface 218 transmits the inbound voice communications (which have been converted to traditional analog format of POTS) to the customer premises via the internal transport medium.

The process described above may be reversed for outgoing voice communications. Thus, outgoing voice communications may be received from the internal transport medium on POTS interface 218. Analog to Digital (A/D) converter 216 may be used to convert the POTS signals to digital signals. The processing system 210 may then be used to convert the digital signals to the wireless protocol. In some cases, processing system 210 may convert, ignore, or add call configuration information during the conversion process. For instance, the processing system 210 may use an internal algorithm to determine when all numbers identifying a telephone number have been received. At that time, the processing system 210 may send the telephone number to transmitter 206, thus simulating a "send" command. Transmitter 206 sends the voice communications and call setup commands received from processing system 210 to antenna 202 for transmission to a distribution point, such as a base station.

In certain embodiments, demarcation device 200 may comprise a power supply 208 for providing electrical power to the components in demarcation device 200. Power supply 208 may be powered through electrical current carried on one or more transport media. For instance, power supply 208 could receive electrical current from a coaxial interface, or through a dedicated transformer plugged into an A/C outlet at customer premises, (e.g., through a D/C connection, which can be 12V, for example, but can also provide any other amperage and/or voltage required by demarcation device 200). In other embodiments, demarcation device 200 could be coupled directly to an A/C power source (at any standard voltage). Processing system 210 can be powered by a connection to power supply 208. In alternate embodiments, processing system 210 might have its own power supply, which could include any of these powering options as well. Power supply 208 may also be used to provide power to internal transport mediums, such as telephone wiring within the customer premises. Alternately, internal transport mediums may be powered with an alternate power supply.

In accordance with some embodiments, the demarcation device 200 might comprise multiple enclosures, each located in a different location and in communication with one another, including separate processing system 404. For instance, either or both AGC 204, and transmitter/receiver 206 may be located in a separate enclosure and may communicate with multiple processing systems 210. It should be appreciated that other variations may be made to the configuration of demarcation device 200. As one example, the voice communications may not be converted to an analog format, but may instead by transmitted and received to an internal transport of customer premises in a digital format. It should also be appreciated that although D/A 214 and A/D 216 converters are illustrated separately from processing system 210, in many embodiments, processing system 210 may include these components.

Figure 3:
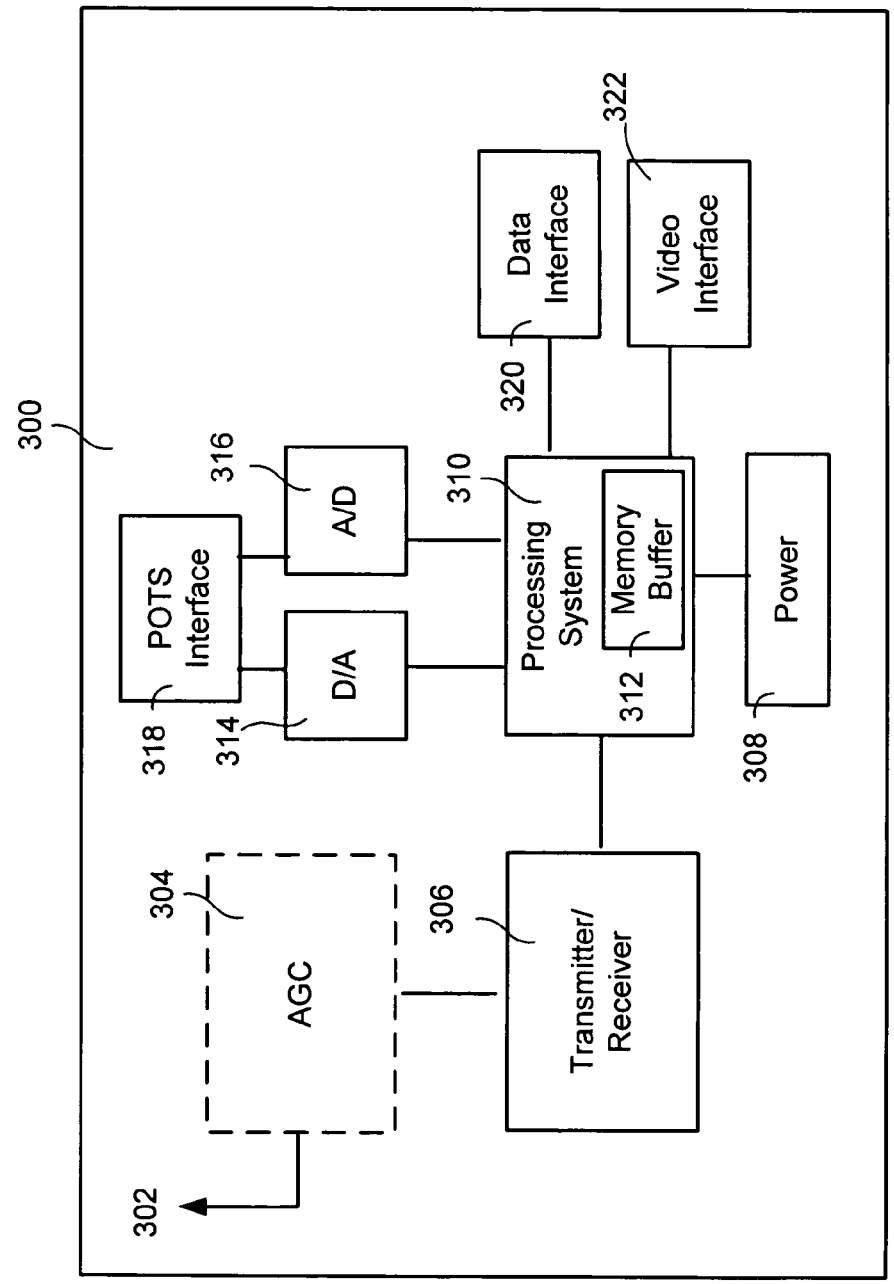
FIG. 3 illustrates a second exemplary embodiment of a network interface device.

FIG. 3 illustrates a second exemplary embodiment of a demarcation device 300. In addition to POTS interface 318 (described in reference to FIG. 2), demarcation device 300 may have one or more additional interfaces 320, 322 in communication with processing system 310. Each additional interface 320, 322 may communicate with any of a variety of internal transport media to send/receive telecommunication information to/from the customer premises. For instance, data interface 320 may be used to transmit data communications to and from customer premises using one or more internal transport mediums (e.g., RJ45 and/or RJ11 interface for connection to unshielded twisted pair cable (which can, for instance, form a 10Base-T network (e.g., Ethernet cable (category 5, 5e, 6, etc., etc.). Video interface 322 may be used to transmit video communications to and from customer premises using an internal transport medium (e.g., coaxial cable, such as RG6 and/or RG59 cable). It should be appreciated that in some embodiments, one or more of the interfaces 318, 320, 322 may use the same internal transport medium. Additionally, in some embodiments, demarcation device 300 may include a plurality of data and/or interfaces, each coupled with its own internal transport medium. Thus, using the interface to the appropriate internal transport medium, demarcation device 300 may communicate with a set-top box, a cable-ready television, a personal computer, a POTS telephone, or to any other device. In some embodiments demarcation device 300 may be programmable and/or addressable, and demarcation device 300 may include an application programming interface to facilitate programming and/or addressing.

Demarcation device 300 is used to receive and transmit, in the wireless protocol format, a variety of different types of telecommunications (e.g., voice, data, video) via antenna 302 using transmitter/receiver 306. As previously described, AGC 304 may be used to automatically adjust the gain of inbound communications. As the demarcation device 300 may be used to receive a variety of different types of communications, processing system 310 may be used to determine the communication type for received telecommunications. For instance, processing system 3002 may separate voice communications (e.g., POTS information) from other telecommunication information. A variety of criteria may be employed by Demarcation device 300 to separate information sets including for example, by frequency, by destination device, information type, etc. Further, in certain embodiments, information sets received in the wireless protocol are multiplexed (for instance, using various time-division multiplexing or wave-division multiplexing schemes known in the art), and processing system 310 may include, or be coupled with, a de-multiplexer capable of separating multiplexed signals. Thus, different multiplexed signals may be used to discriminate between telecommunication information sets. Transmitter/receiver 306 may be capable of transmitting on all assigned multiplexed signals. Alternately, a plurality of transmitter/receivers may be employed for each multiplexed signal.

After determining the type of telecommunication information received via antenna 302, processing system 310 may be used to convert from the wireless protocol to the appropriate format for the information set. For example, voice communications may be converted to POTS using processing system 310 and D/A 314 so that POTS Interface 318 may transmit the communications to the customer premises via an internal transport medium. Similarly, processing system 310 may convert data communications from the wireless protocol to a digital data format and video data from the wireless protocol to a digital video format. During conversion, processing system 310 may employ memory buffer 312 as needed. Processing system 310 may also be used to perform a variety of other functions on telecommunications information, such as encoding/decoding information, storing information, filtering information, or other processing of the telecommunications information.

Additionally, processing system 310 may be used to route information sets received via antenna 302 to the appropriate interface 318, 320, 322, according to the type of telecommunication information in the set (e.g., voice communications, data communications (e.g., IP data), video communications, etc.) as well as any addressing information associated with either the set or the information it comprises (e.g., a specified destination port or network address for a particular subset of telecommunication information). For instance, if IP data is received by receiver 306, such data can be routed to a data interface to an Ethernet connection, a data interface to the existing telephone wiring (e.g., in an HPNA implementation), a data interface to coaxial cable, a data interface to a internal wireless interface (e.g., IEEE 802.11 wireless transport medium), or to any other appropriate medium (perhaps via an appropriate line driver). Alternatively, the IP data can be routed to any combination of these interfaces, and any of these interfaces could also receive IP or other telecommunication information from a CPE at the customer premises, which are transmitted to processing system 310 for conversion to the wireless protocol. Thus, it should be appreciated that the internal transport medium(s) may use any number of protocols for data communications, including DSL formats (e.g., communications that are received from a modem, such as an xDSL modem and transported from the xDSL modem to an interface on demarcation device), and those previously mentioned. As another example, if video communications are received, processing system 310 may convert the video communications from the wireless protocol to a video format supported by the CPE. Thus, video interface may use an internal transport medium, such as coaxial cable, to support a wide variety of CPE and associated services for transmission of video (e.g., MPEG, HDTV, NTSC or PAL) to the customer premises.

Processing system 310 is also used to convert data received on POTS interface 318 or data interface 320 to the wireless protocol. The transmitter 306 is then used to transmit the communications via a wireless transport medium. In some instances, the communications may be aggregated before transmission.

Figure 4:
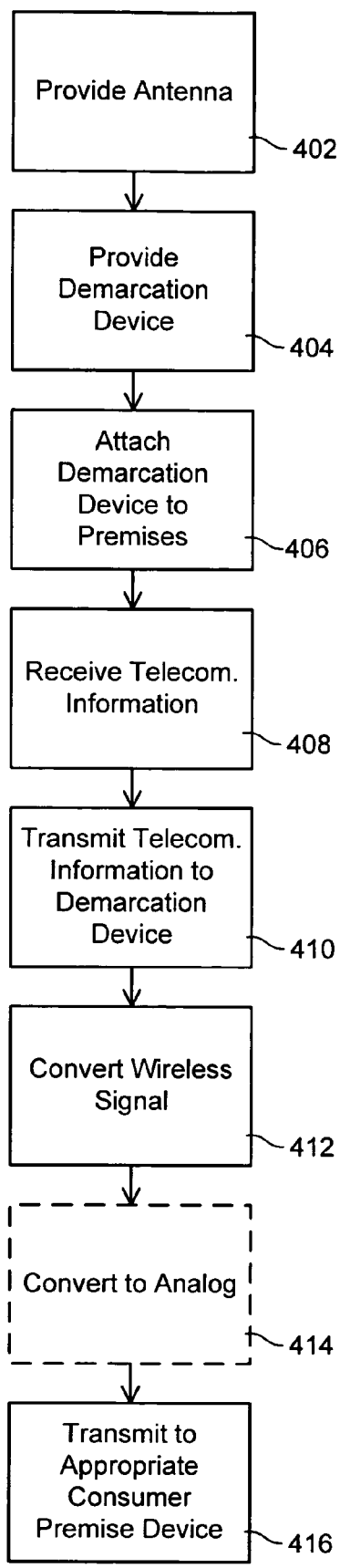
FIG. 4 is a flow diagram of an exemplary a method of providing telecommunication services using a demarcation device.

FIG. 4 illustrates an exemplary method of providing telecommunications to a customer premises. It should be noted that the blocks displayed in FIG. 4 are arranged for ease of description only, and their order and arrangement should not be considered to limit the scope of the invention. Therefore, some of functions illustrated may be performed in an order different than described, or they may be omitted entirely.

The method includes providing 402 an antenna configured to transmit outbound communications in a wireless communications protocol and receive inbound communications in the wireless protocol. The antenna uses a wireless transport medium to transport and received the communications. A demarcation device is also provided 404. In one embodiment, the demarcation device may be a NID, as previously described. The Antenna may be attached 406 to the customer premises. Additionally, in some embodiments, the demarcation device is also attached 406 to an external wall of the customer premises, or other location, such as proximate to a particular CPE or coupled with an internal transport medium in an attic, garage, basement, crawl space or the like.

A distribution point, such as a base station, may receive 408 telecommunication information from a telecommunication information provider or other source of telecommunication information. As discussed above, the telecommunication information can comprise a plurality of sets of telecommunication information, and each telecommunication information set can be associated with a particular telecommunication service. In many embodiments, the distribution point can receive 408 the plurality of telecommunication information sets from a plurality of telecommunication information providers.

The distribution point may then transmit 410 the telecommunication information to the demarcation device through wireless transport medium. As discussed above, the distribution point need be neither the ultimate source (or for communications received from the demarcation device, the ultimate destination) of the telecommunication information. The demarcation device may determine the type of telecommunication information received from the distribution point. The information may be separated into discrete information sets, according to, inter alia, any of the criteria discussed above. Once the information sets have been separated, the demarcation device may then convert 412 the telecommunications received via the antenna from the wireless protocol to the appropriate format supported by the CPE (e.g., POTS, IP, etc.). In some instances, the telecommunications may need to be further converted 414 to analog signals (e.g., for analog telephones). Processing can additionally include encoding/decoding information, storing information, discarding telecommunications (if appropriate), or other types of telecommunication processing. After the telecommunications have been converted 412 (and in some cases 414), the demarcation device then transports 416 the telecommunications to one or more destination CPE(s) using the appropriate internal transport medium.

Figure 5:
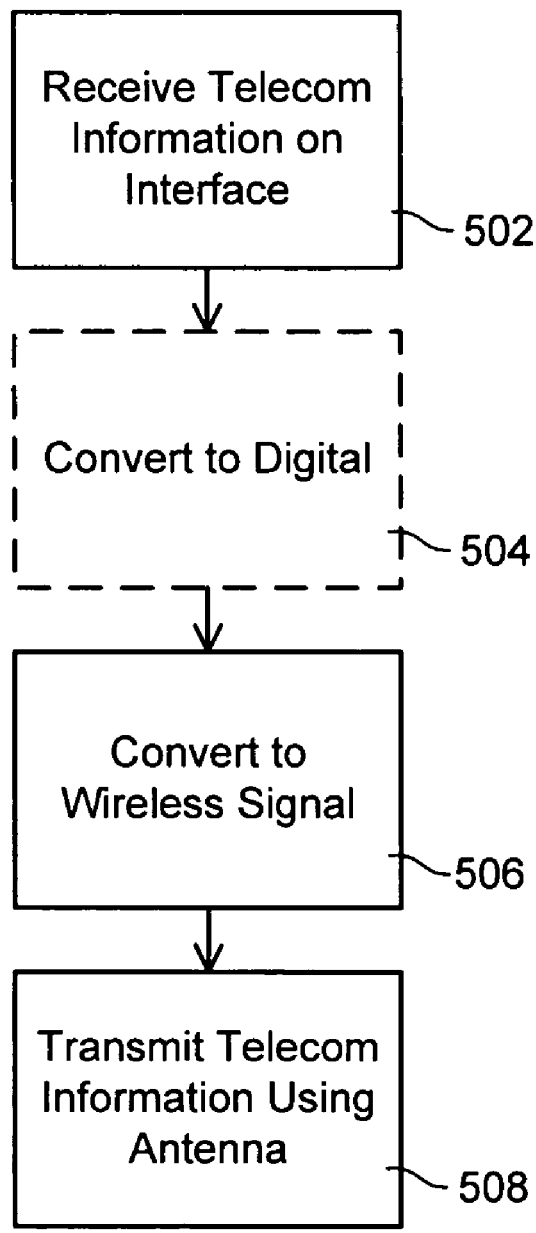
FIG. 5 is a flow diagram of an exemplary method that may be used to transmit telecommunications from a customer premises using a wireless protocol.

FIG. 5 illustrates an exemplary embodiment that may be used to transmit telecommunications from a customer premises in a wireless protocol via an antenna using a wireless transport medium. Telecommunications are received 502 on a demarcation device interface from a CPE via an internal transport medium. Merely by way of example, the telecommunication information received from the customer premises may include video information, IP data, telephony information and the like, as well as information related to providing telecommunication services, such as video provision information, information related to data transmission services, telephony signaling information, and the like.

If the telecommunications are in analog format, they are converted 504 to digital. The digital communications are then converted 506 from the received format (voice, IP, video, etc.) to the wireless protocol. The demarcation device then transmits 508, over a wireless transport medium, the telecommunications in the wireless protocol. In some embodiments, simultaneous and/or near simultaneous two-way transmission of telecommunications. Information can be transmitted to and/or received from, the customer premises on wireless transport medium, which can be in communication with one or more internal transport media, as discussed in detail herein.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing telephone services to a customer premises, the system comprising:
   an antenna affixed to the exterior of the customer premises, to transmit outbound voice communications in a wireless protocol and to receive inbound voice communications in the wireless protocol, wherein the antenna is further configured to transmit and receive data communications in the wireless protocol, a demarcation device is further configured to convert inbound data communications from the wireless protocol to a digital data format and to convert outbound data communications from the digital data format to the wireless protocol;
   the demarcation device, coupled with the antenna, the demarcation device to convert the inbound voice communications from the wireless protocol to a wired format and to convert the outbound voice communications from the wired format to the wireless protocol;
   an interface to the customer premises, coupled with the demarcation device, to transmit the inbound voice communications in the wired format to the customer premises via a first internal transport medium and to transmit the outbound voice communications received in the wired format on the first internal transport medium to the demarcation device; and
   a data interface to the customer premises, coupled with the demarcation device, to transmit the inbound data communications in the digital format to the customer premises via a second internal transport medium and to transmit the outbound data communications received in the digital format on the second internal transport medium to the demarcation device.

2. The system of claim 1, wherein the wired format comprises a Plain Old Telephone Service (POTS) format.

3. The system of claim 1, further comprising an automatic gain control, coupled with the antenna and the demarcation device, to automatically adjust the gain of the inbound voice communications received from the antenna.

4. The system of claim 1, wherein the data interface is a digital subscriber line (DSL) interface to the customer premises, the digital data format is a DSL format, and the second internal transport medium is telephone wiring.

5. The system of claim 1, wherein the digital data format is an Internet Protocol (IP) format.

6. The system of claim 5, wherein the second internal transport medium is Ethernet cable.

7. The system of claim 1, wherein the antenna is further configured to receive video communications in the wireless protocol, the demarcation device is further configured to convert inbound video communications from the wireless protocol to a digital video format, the system further comprising:
   a video interface to the customer premises, coupled with the demarcation device, to transmit the inbound video communications in the digital video format to the customer premises via a second internal transport medium.

8. The system of claim 7, wherein the second internal transport medium is coaxial cable.

9. The system of claim 1, wherein the first internal transport medium is twisted pair cable.

10. The system of claim 9, wherein the twisted pair cable is telephone wiring.

11. The system of claim 1, further comprising a distribution point, to receive the outbound voice communications from the antenna and to transmit the inbound voice communications to the antenna.

12. The system of claim 11, wherein the distribution point is a wireless base station.

13. The system of claim 1, wherein the wireless protocol is Code Division Multiple Access (CDMA).

14. The system of claim 1, wherein the wireless protocol is Global System for Mobile communications (GSM).

15. The system of claim 1, wherein the wireless protocol is WiFi.

16. The system of claim 1, wherein the demarcation device comprises a network interface device.

17. A system for providing telecommunication services to a customer premises, the system comprising:
   an antenna affixed to the exterior of the customer premises, to transmit outbound telecommunications in a wireless protocol and to receive inbound telecommunications in the wireless protocol;
   an automatic gain control, coupled with the antenna, to automatically adjust the gain of the inbound telecommunications;
   a demarcation device, coupled with the automatic gain control, configured to determine the inbound telecommunications is one of voice communications, data communications, and video communications; to convert the inbound telecommunications from the wireless protocol to one of a Plain Old Telephone Service (POTS) format, a digital data format, and a digital video format; to convert outbound voice communications from the POTS format to the wireless protocol; and to convert outbound data communications from the digital data format to the wireless protocol;
   a POTS interface to the customer premises, coupled with the demarcation device, to transmit the inbound voice communications in the POTS format to the customer premises via a first internal transport medium and to transmit the outbound voice communications received in the POTS format on the first internal transport medium to the demarcation device;
a data interface to the customer premises, coupled with the demarcation device, to transmit the inbound data communications in the digital format to the customer premises via a second internal transport medium and to transmit the outbound data communications received in the digital format on the second internal transport medium to the demarcation device; and
a video interface to the customer premises, coupled with the demarcation device, to transmit the inbound video communications in the digital video format to the customer premises via a second internal transport medium.

18. A network interface device (NID) for providing telephone services to a customer premises comprising:
a receiver to receive inbound voice communications from an antenna affixed to the exterior of the customer premises in the wireless protocol;
a transmitter to transmit outbound voice communications in the wireless protocol;
a processor, coupled with the receiver and the transmitter, to convert the inbound voice communications from the wireless protocol to a digital wired format and to convert the outbound voice communications from the digital wired format to the wireless protocol;
a converter, coupled with the processor, to convert the inbound voice communications from the digital wired format to analog Plain Old Telephone Service (POTS) and to convert the outbound voice communications from POTS to the digital wired format; and
an interface, coupled with the converter, to transmit the inbound voice communications in the POTS format to the customer premises via a first internal transport medium and to transmit the outbound voice communications received in the POTS format on the first internal transport medium to the converter.

19. The NID of claim 18, wherein the receiver is further to receive inbound data communications in the wireless protocol, the transmitter is further configured to transmit outbound data communications in the wireless protocol, the processor is further configured to convert the inbound data communications from the wireless protocol to a digital data format and to convert outbound data communications from the digital data format to the wireless protocol, the NID further comprising:
a data interface to the customer premises, coupled with the processor, to transmit the inbound data communications in the digital data format to the customer premises via a second internal transport medium and to transmit the outbound data communications received in the digital data format on the second internal transport medium to the processor.

20. The NID of claim 18, wherein the receiver is further configured to receive inbound video communications in the wireless protocol, the transmitter is further configured to transmit outbound video communications in the wireless protocol, the processor is further configured to convert the inbound video communications from the wireless protocol to a digital video format, the NID further comprising:
a video interface to the customer premises, coupled with the processor, to transmit the inbound video communications in the digital video format to the customer premises via a second internal transport medium.

21. A method of providing telecommunication services to a customer premises, the method comprising:
providing an antenna affixed to the exterior of the customer premises configured to transmit outbound communications in a wireless protocol and to receive inbound communications in the wireless protocol, using a wireless transport medium;
providing a demarcation device configured to convert inbound communications from the wireless protocol to a Plain Old Telephone Service (POTS) format and to convert the outbound communications from the POTS format to the wireless protocol, wherein providing the demarcation device comprises providing a demarcation device further configured to convert inbound communications from the wireless protocol to one of a digital data format and a digital video format and to convert outbound communications from the digital data format to the wireless protocol;
receiving inbound communications at the antenna;
converting the inbound communications from the wireless protocol to the POTS format using the demarcation device;
transmitting the inbound communications in the POTS format to the customer premises via a first internal transport medium; and
receiving second inbound communications at the antenna;
determining, with the demarcation device, the second inbound communications are data communications;
converting the second inbound communications from the wireless protocol to the digital data format using the demarcation device; and
transmitting the second inbound communications in the digital data format to the customer premises via a second internal transport medium.

22. The method of claim 21, further comprising:
receiving outbound communications in the POTS format from the customer premises via the first internal transport medium;
converting the outbound communications from the POTS format to the wireless protocol using the demarcation device; and
transmitting the outbound communications in the wireless protocol using the antenna.

23. The method of claim 21, further comprising:
receiving outbound data communications in the digital data format from the customer premises via the second internal transport medium;
converting the outbound data communications from the digital data format to the wireless protocol using the demarcation device; and
transmitting the outbound data communications in the wireless protocol using the antenna.

24. The method of claim 21, further comprising:
receiving third inbound communications at the antenna;
determining, with the demarcation device, the third inbound communications are video communications;
converting the third inbound communications from the wireless protocol to the digital video format using the demarcation device; and
transmitting the third inbound communications in the digital video format to the customer premises via a third internal transport medium.

25. The method of claim 21, further comprising providing an automatic gain control circuit to automatically adjust the gain of inbound communications received via the antenna.

* * * * *